L. EHRKE.
BREAD BOARD.
APPLICATION FILED FEB. 7, 1919.
1,315,101.
Patented Sept. 2, 1919.
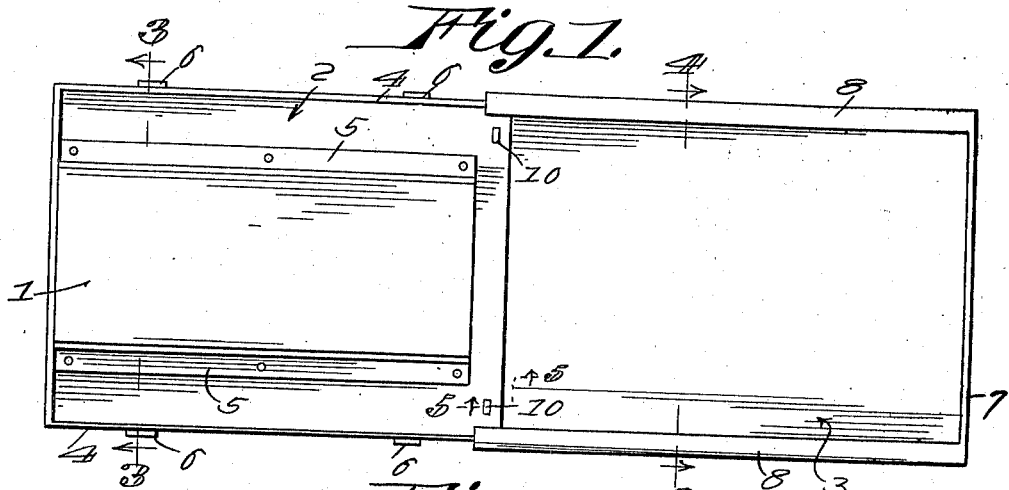
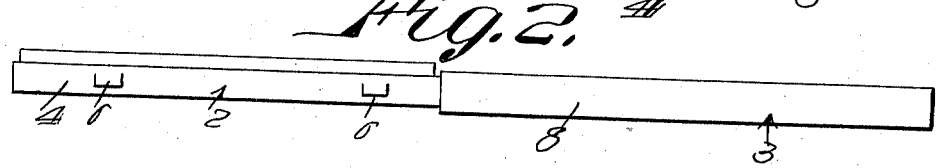
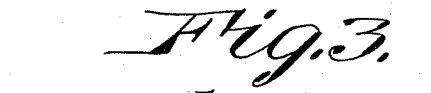
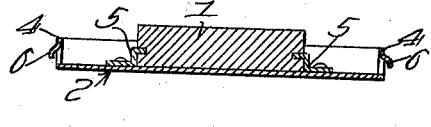
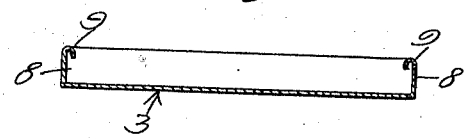
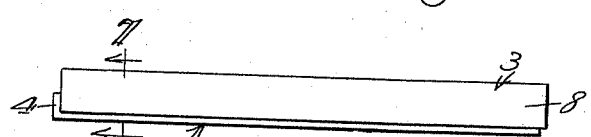
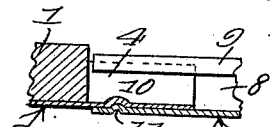
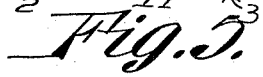
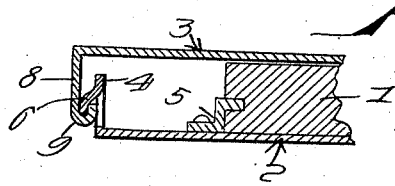
Inventor
Lydia Ehrke,
By
E. Hume Talbert,
Attorney

UNITED STATES PATENT OFFICE.

LYDIA EHRKE, OF BOZEMAN, MONTANA.

BREAD-BOARD.

1,315,101. Specification of Letters Patent. Patented Sept. 2, 1919.

Application filed February 7, 1919. Serial No. 275,605.

*To all whom it may concern:*

Be it known that LYDIA EHRKE, a citizen of the United States of America, residing at Bozeman, in the county of Gallatin and State of Montana, has invented new and useful Improvements in Bread-Boards, of which the following is a specification.

The object of the invention is to provide a new and novel form of bread board which is carried by a suitable tray designed to catch the crumbs dropping from the bread as sliced. The board itself is suitably mounted in a tray so that it may be removed therefrom and the tray is of a peculiar construction that will enable it to be separated and made to inclose the board when the device is not in use. This closed position of the tray materially decreasing its size so that it may occupy but a small amount of space.

The invention is illustrated and described in a specific embodiment, to which, however, it is not to be restricted. The right is reserved to make such changes or alterations as the actual reduction to practice may suggest, in so far as such changes or alterations are compatible in spirit with the annexed claims.

In the accompanying drawings in which the same numerals of reference designate the same parts:—

Figure 1 is a top plan view of the improved device.

Fig. 2 is a side elevational view.

Fig. 3 is a section on the line 3—3 of Fig. 1.

Fig. 4 is a section on the line 4—4 of Fig. 1.

Fig. 5 is a section on the line 5—5 of Fig. 1.

Fig. 6 is a side elevational view of the device in closed position.

Fig. 7 is a section on the line 7—7 of Fig. 6.

Referring to the drawings, the invention is shown as comprising a board 1 which is carried in a suitable tray consisting of sections 2 and 3. The section 2 is formed with an upturned flange 4 at one end and on both sides but the height of this flange is slightly less than the thickness of the board 1 which is carried in the section 2 and positioned midway between the two said flanges 4, its end, when the board is in normal position, abutting the end flange 4. To secure the board in position in the section 1 there are provided two Z rails 5. These rails are secured by any appropriate means on the bottom of the section 2 and their free-flanges enter longitudinal grooves formed in the said edges of the board 1. Thus the board is secured in place in the section 2 but it may be removed therefrom by sliding it longitudinally away from the end flange 4.

Struck outwardly from the said flanges 4 there are the ears 6 the purpose of which is hereinafter set forth.

Designed to connect with the section 2 of the tray, there is a section 3 which is formed with an upturned end flange 7 identical with the end flange 4 but this section 3 has its said flanges 8 at their upper ends turned back on themselves as indicated at 9, thus making the flanges 8 J-shaped in cross section.

When the section 3 is attached to the section 2 the end portions of the flanges 8 remote from the flange 7 have their turned-back portions 9 overhanging the upper edges of the said flanges 4 of the section 2 and the bottom of the section 3 after it connects with the section 2 lies underneath the bottom of the latter. That the two sections may be maintained in these relative positions, the bottom of the section 1 is indented from below as indicated at 10 and the bottom of the section 3 is similarly indented as indicated to provide projections 11 which rest in the indentations 10. When the sections 2 and 3 are connected together the projections 11 are sprung into the indentations 10, the bent-back portions 9 of the ends of the flanges 8 overhanging the upper edges of the ends of the flanges 4. The two sections thus form a tray effective in catching crumbs made by the slicing of bread.

When the device is not in use, the section 3 is adapted for connection to the section 2 in such a way as to inclose the board 1 between them. To effect this attachment, the section 3 is inverted and made to slide over the section 2 when the bent-back portions 9 of its flanges 8 engage the edges of the ears 6. Thus the two sections are secured together with a board between them and the length of the device as a whole is reduced to half the length which obtains when it is in extended position with the sections 3 and 2 connected as shown in Figs. 1, 2 and 5.

From the foregoing description and the accompanying drawing, it is believed that a clear enough understanding of the invention is to be had to render further description unnecessary.

The invention having been described what is claimed new and useful is:—

1. A device of the kind described comprising a tray formed in two sections, a board carried on one of the sections, and means for connecting the sections together in either of two different ways so that they form a tray for the board or an inclosing medium therefor.

2. In a device of the kind described, a tray comprising two sections, and a board carried by one of the sections, one section being formed with flanges on opposite sides and at one end and having ears outstruck from these flanges, the other section being formed with a flange at one end and with inverted J-shaped flanges on longitudinal sides, both sections being formed on their bottoms at the edges remote from the end flanges with indentations and projections respectively, the projections engaging the projections on the one section engaging the indentations on the other and the J-shaped longitudinal flanges engaging the longitudinal flanges of the other section or the ears formed on said longitudinal flanges, whereby the two sections may be connected to form a tray for the board or relatively inverted and connected to form an inclosure means therefor.

In testimony whereof I affix my signature.

LYDIA EHRKE.